Patented Jan. 1, 1935

1,986,672

UNITED STATES PATENT OFFICE 1,986,672

BLEACHING POWDER

George Harry Bergman, Chicago, Ill.

No Drawing. Application March 30, 1932,
Serial No. 602,111

2 Claims. (Cl. 23—5)

This invention relates to a bleaching composition and more particularly to a substantially stable bleaching powder and to its method of preparation.

As is well known, an aqueous solution of hydrogen peroxide has bleaching properties, acting in a different manner upon various substances, depending upon whether the solution is alkaline, neutral or acid. The usual neutral, or slightly acid, aqueous solution of hydrogen peroxide as generally obtainable is, however, known to be a very unstable product and, in fact, unless obtained from reputable sources, is frequently very much weaker than the label on the container indicates.

For convenience in storage and transportation, it would obviously be much more satisfactory to have a hydrogen peroxide preparation in a solid or powdered state, especially for use in connection with the bleaching of fabrics, textiles and the like. To the best of my knowledge, however, no stable preparation of this type has heretofore been devised.

It is, therefore, an object of this invention to provide a stable bleaching composition in a solid state, and preferably in the form of a powder, comprising a mixture containing hydrogen peroxide or a reaction product of hydrogen peroxide and an anhydrous carbonate.

It is a further object of this invention to provide a solid bleaching composition largely composed of an alkali-metal carbonate or mixture of carbonates in a hydrated or partially hydrated form wherein at least a part of the water of hydration is an aqueous solution of hydrogen peroxide.

Other and further important objects of this invention will be apparent from the following description and appended claims.

I have now found, if an anhydrous or only partially hydrated form of a suitable alkali-metal carbonate, such as anhydrous sodium or potassium carbonate, is added in excess to a solution of hydrogen peroxide, that the carbonate will take up the hydrogen peroxide solution as water of hydration to form a hydrated carbonate or a carbonate containing more water of crystallization than the particular carbonate started with, or that some of the hydrogen peroxide will be occluded in the crystals of carbonate formed by the reaction. The resulting product will thus be directly formed, if an excess of the carbonate be added, in a solid form. By stirring the reaction mixture, small crystals of the hydrated carbon containing the hydrogen peroxide bound thereto as water of crystallization can be obtained, or the whole mass may be allowed to crystallize and then may be broken up, or powdered, as desired.

While I do not limit my invention to any particular theory, it is my understanding that a percarbonate may be formed as a reaction product of the carbonate used and the hydrogen peroxide, but it may be that the hydrogen peroxide solution is merely mechanically or chemically bound to the carbonate in a manner analogous to water of hydration.

My invention, therefore, relates to utilizing hydrogen peroxide by incorporating it with an alkaline carbonate so as to form a compound that does not deteriorate when kept in closed containers, and has bleaching properties not found in other commercial bleaches now on the market.

In the preparation of the improved bleaching powder, I use a hydrogen peroxide solution containing 30% by weight of $H_2O_2$ as it seems to be more stable than one of lesser strength.

In preparing this bleach, I use anhydrous soda ash (sodium carbonate) and sodium bicarbonate, which is dried just before using to be sure it contains no free water.

I preferably first add the bicarbonate of soda to the hydrogen peroxide solution, because the alkalinity of the bicarbonate is less than that of the soda ash, so that the resulting mixture does not generate as much heat of reaction as with soda ash.

When the sodium bicarbonate, which is alkaline in reaction, is added to the slightly acid hydrogen peroxide solution, heat is generated and the percarbonate of soda is formed, according to my theory. This solution is then added to an excess of anhydrous, or only partially hydrated soda ash so that the finished product is a powder containing the sodium percarbonate.

This bleach can also be prepared from the soda ash and hydrogen peroxide.

I have prepared the bleaching powder according to the following formula, although other percentages can be used:

| | Parts | Parts by weight |
|---|---|---|
| Soda ash | 4½ | 135 |
| Sodium bicarbonate | ⅕ | 6 |
| Hydrogen peroxide (30%) | ⅓ | 10 |

I have also prepared a satisfactory bleach containing soap, as follows:

|  | Parts by weight |
|---|---|
| Soda ash | 2½ |
| Sodium bicarbonate | ⅕ |
| Hydrogen peroxide (30%) | ⅓ |
| Powdered soap | 2¼ |

I first dry thoroughly the sodium bicarbonate and soda ash and then mix the powdered soap with the soda ash. I then dissolve the sodium bicarbonate in the hydrogen peroxide as in the manufacture of the bleaching powder, previously described. To this solution I add the mixture of soda ash and powdered soap and stir constantly until a uniform compound is obtained.

It will be understood that the resulting product, if the reaction mass be stirred, will be in the form of small crystals or crystalline particles but that the stirring may be omitted and the solid product thereby obtained may then be broken up into lumps, or, preferably, powdered. By either method, a substantially stable preparation is obtained, free from apparent water, and suitable for use in the bleaching of fabrics, textiles and the like.

I claim:

1. A bleaching powder comprising an apparently dry mixture obtainable by reacting a hydrogen peroxide solution with sodium bicarbonate and then adding anhydrous sodium carbonate all in the proportions of substantially 10 parts of 30 volume percent of hydrogen peroxide, 6 parts of sodium bicarbonate and 135 parts of anhydrous sodium carbonate.

2. The method of preparing a bleaching powder, which comprises mixing aqueous hydrogen peroxide, sodium bicarbonate and anhydrous sodium carbonate in substantially the proportions of 10 parts of 30 volume percent of hydrogen peroxide, 6 parts of sodium bicarbonate and 135 parts of anhydrous sodium carbonate.

GEORGE HARRY BERGMAN.